United States Patent

[11] 3,530,766

[72] Inventor John S. Pilch,
Ware, Massachusetts
[21] Appl. No. 790,082
[22] Filed Jan. 9, 1969
[45] Patented Sept. 29, 1970
[73] Assignee Ware Machine Works, Inc.
Ware, Massachusetts
a corporation of Massachusetts

[54] CONTROL MECHANISM FOR AUTOMATICALLY RESTRICTING THE FLOW OF FLUID IN A CONDUIT LEADING TO HYDRAULICALLY ACTUATED MEANS
6 Claims, 7 Drawing Figs.

[52] U.S. Cl............................................. 91/411,
91/410, 91/448, 214/138, 212/66
[51] Int. Cl........................................F15b 11/04,
F15b 11/16
[50] Field of Search........................................ 91/392,
448, 448(IT), 411, 410, 445

[56] References Cited
UNITED STATES PATENTS
| | | | |
|---|---|---|---|
| 1,877,102 | 9/1932 | Whitesell...................... | 60/52UX |
| 2,378,497 | 6/1945 | Phillips........................ | 91/411X |
| 3,475,000 | 10/1969 | Fry et al....................... | 91/410X |

FOREIGN PATENTS
| | | | |
|---|---|---|---|
| 551,205 | 5/1932 | Germany .................. | 91/410 |

Primary Examiner—Edgar W. Geoghegan
Attorney—Dike, Thompson and Bronstein

ABSTRACT: A mechanism for automatically restricting the flow of fluid in a conduit leading between a source of fluid under pressure and hydraulically actuated means for causing pivotal movement of a member. The speed of pivotal movement of the member is rapid during one portion of its pivotal movement but the speed is automatically reduced at a predetermined portion of its pivotal movement and such reduced speed is maintained during at least a portion of its subsequent pivotal movement.

Patented Sept. 29, 1970

3,530,766

INVENTOR.
JOHN S. PILCH
BY
Dike, Thompson & Bronstein
ATTORNEYS

3,530,766

CONTROL MECHANISM FOR AUTOMATICALLY RESTRICTING THE FLOW OF FLUID IN A CONDUIT LEADING TO HYDRAULICALLY ACTUATED MEANS

BACKGROUND OF THE INVENTION

This invention relates to means for automatically restricting the flow of fluid in a conduit leading between a source of fluid under pressure and hydraulically actuated means for causing pivotal movement of a member whereby the speed of pivotal movement of the member is rapid during one portion of its pivotal movement but is automatically reduced during a predetermined portion of its pivotal movement and such reduced speed is maintained during at least a portion of its subsequent pivotal movement thereby minimizing failures of the hydraulic system and/or the mechanism.

Many devices have members which are pivotally moved by hydraulically actuated means, for example, the horizontal pivotal movement of the boom carrying the bucket of a backhoe, trencher or other excavating device. It has long been considered desirable to provide means for automatically slowing down the pivotal movement of such a member near the end of its pivotal movement in order to prevent damage or injury to the apparatus when at the end of its pivotal movement the movement is completely stopped by mechanical stop means or by other means which cause mechanical or hydraulic failures.

In my prior U.S. Pat. No. 3,407,946 I have disclosed a pair of hydraulically operated jacks and a pair of throttling valves. Each throttling valve is operable by a cam on the turret of a backhoe to restrict the flow of fluid only in the conduit which leads from the rod end of the hydraulic jack to the main control valve during the return or inactive stroke of the ram. Because the rod of the hydraulic jack is attached to the turret, a braking effect on the pivotal movement of the turret results, and this braking effect opposes the pivoting force which is simultaneously being exerted on the turret by the piston of the other hydraulic jack. However, because during this braking action if the operator continues to hold the main control valve in position to supply fluid under full volume to the operative end of the jack which is exerting the pivoting force and also because the momentum of the loaded bucket and swinging boom is great it has been found in practice that these combined forces create pressures on the fluid circuit of the inactive cylinder which develop to a magnitude of between 6,000 and 9,000 pounds per square inch and failures develop in use as a result of these excessive pressures.

Another proposed solution is disclosed in U.S. Pat. No. 3,343,686 dated September 26, 1967, in which two one-way restricter valves are provided, one in a conduit between the main control valve and the rod end of the hydraulic jack and the other in the conduit from the closed or cylinder end of the same cylinder and the main control valve. One of these restricter valves is always closed in restricting position and restricts all fluid that is delivered to one jack during the complete retracting cycle of this jack. In other words, all fluid delivered to this jack for the purpose of retracting the same is restricted and it is impossible to deliver unrestricted fluid to this jack during any portion of its retracting cycle. The other restricter valve also is always closed in restricting position and restricts all fluid that is being exhausted from this same jack during this same retracting cycle, and it is impossible to exhaust unrestricted fluid from this jack. The only time these valves open is when fluid is supplied by the operator to extend the jack. Then both these valves are opened by the fluid flowing through them. Furthermore, these valves are not operated by the turret. In addition, in this construction, it is necessary to employ three different cylinders to cause pivotal movement of the turret making the apparatus expensive to manufacture.

One object of this invention is to provide means for automatically restricting the flow of fluid in a conduit leading between a source of fluid under pressure and the operative side of hydraulically actuated means for causing pivotal movement of a member whereby the speed of pivotal movement of the member is rapid during one portion of its pivotal movement but is automatically reduced at a predetermined portion of its pivotal movement and such reduced speed is maintained during at least a portion of its subsequent pivotal movement minimizing failures in the hydraulic system and/or the mechanism.

Another object is to provide such an apparatus which is economical to manufacture.

A further object is to provide such an apparatus in which the member may be moved pivotally 180° first in one direction and then in the opposite direction by the use of only two hydraulically actuated means for causing pivotal movement of said member.

Another object of this invention is to provide a means for automatically restricting the flow of fluid in a conduit leading between the source of fluid under pressure and the operative side of a hydraulic jack whereby the flow of fluid delivered to the jack will be unrestricted during a portion of its movement, and the flow of fluid delivered to this same jack will be restricted during a subsequent portion of its movement.

Other objects and advantages of the invention will be apparent from the following description taken in conjunction with the accompanying drawings wherein a preferred embodiment of the invention is shown.

DESCRIPTION OF THE PREFERRED EMBODIMENT

Figure 1:
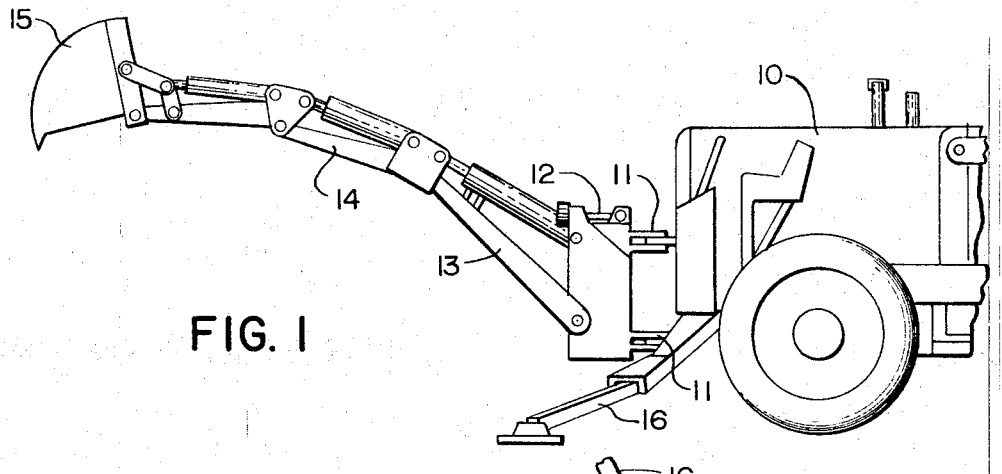
FIG. 1 is a side view of a tractor mounted backhoe embodying the invention.
Figure 2:
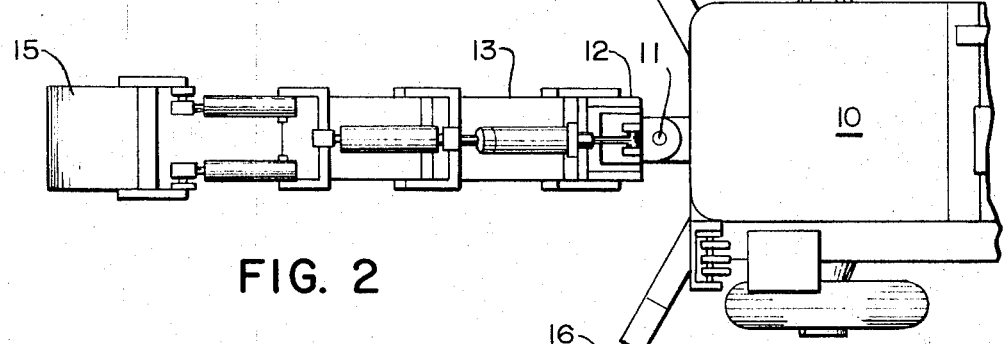
FIG. 2 is a plan view of the apparatus shown in FIG. 1.

Referring to the drawings wherein similar reference characters designate corresponding parts throughout, the tractor mounted backhoe shown in FIGS. 1 and 2 comprises the tractor 10 having vertical pivots 11 for the turret 12 which carries the boom 13 on the end of which is pivotally connected the dipper stick 14 which in turn carries the bucket 15.

The tractor is provided with the ground engaging stabilizer legs 16.

Figure 5:
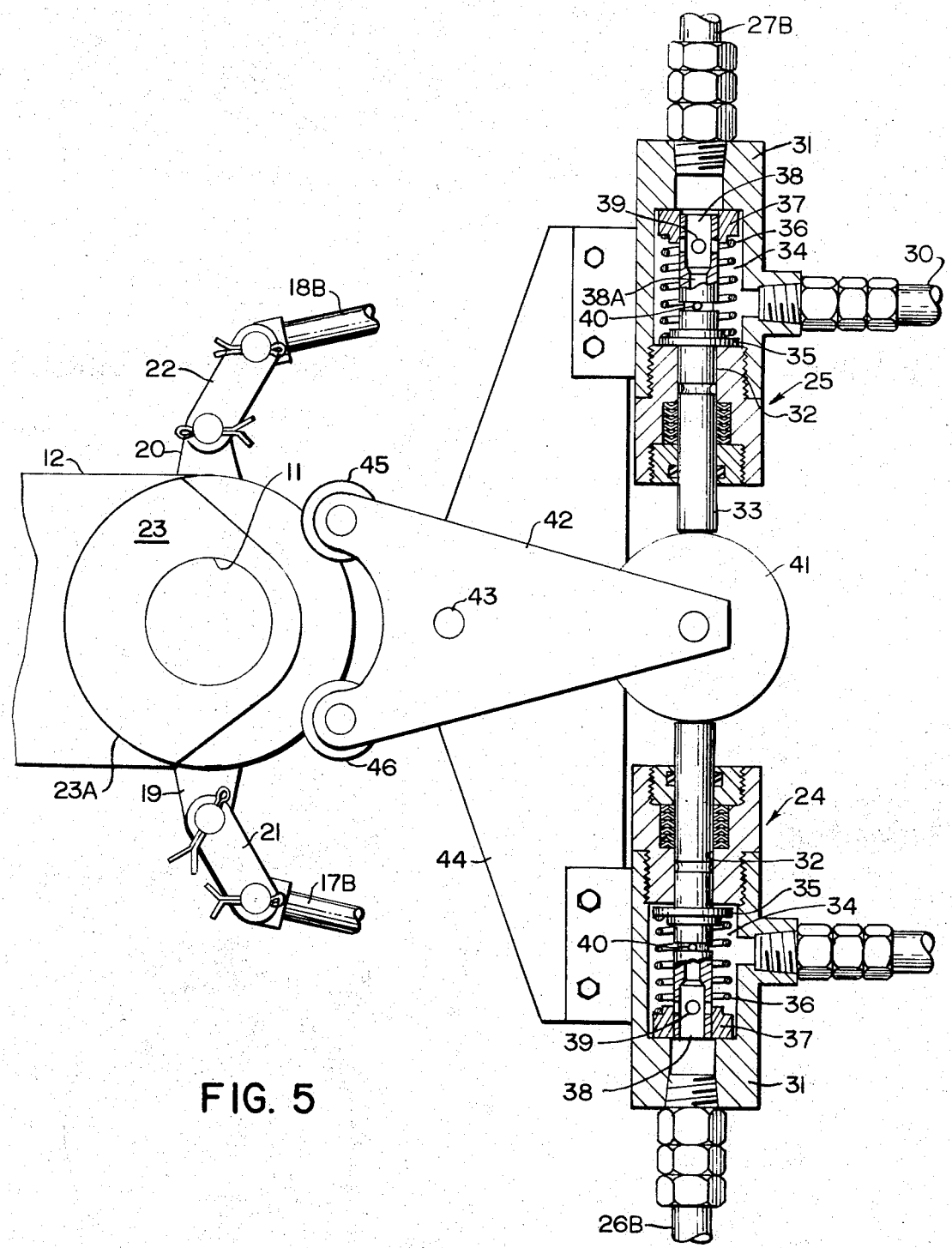
FIG. 5 is a view similar to FIG. 4, but illustrating the restricter valve actuating mechanism in neutral position and both restricter valves in longitudinal section.

The turret 12 is adapted to be moved pivotally about a vertical axis, formed by the pivots 11, by means of hydraulic jacks 17 and 18 (FIG. 3) having rods 17B and 18B attached to their rams 17A and 18A respectively. As shown in FIG. 5, the rods 17B and 18B are pivotally connected to lugs 19 and 20 through links 21 and 22 respectively so that pivotal movements of the turret 12 and the boom 13 about pivots 11 are caused when the rods are alternately moved inwardly of the cylinders 17A and 18A respectively.

The cam 23 is carried by turret 12 and is rotatable therewith about the pivots 11.

Figure 7:
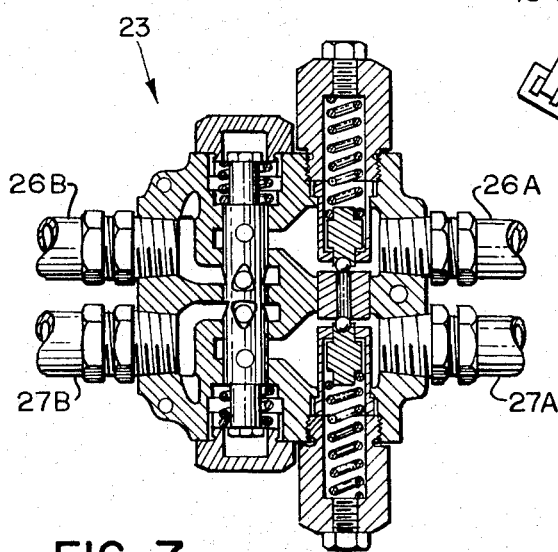
FIG. 7 is an enlarged section of the relief valve which is included in the system.

The hydraulic system includes a customary relief valve 23 (FIGS. 3 and 7) connected in the lines 26A and 27A which lead to the rod sides of hydraulic jacks 17 and 18 and which valve is connected to the restricter valves 24 and 25 by hydraulic conduits 26B and 27B respectively.

Restricter valve 24 is connected by hydraulic conduit 28 to main control valve 29 and restricter valve 25 is connected by hydraulic conduit 30 to said main control valve.

Figure 6:
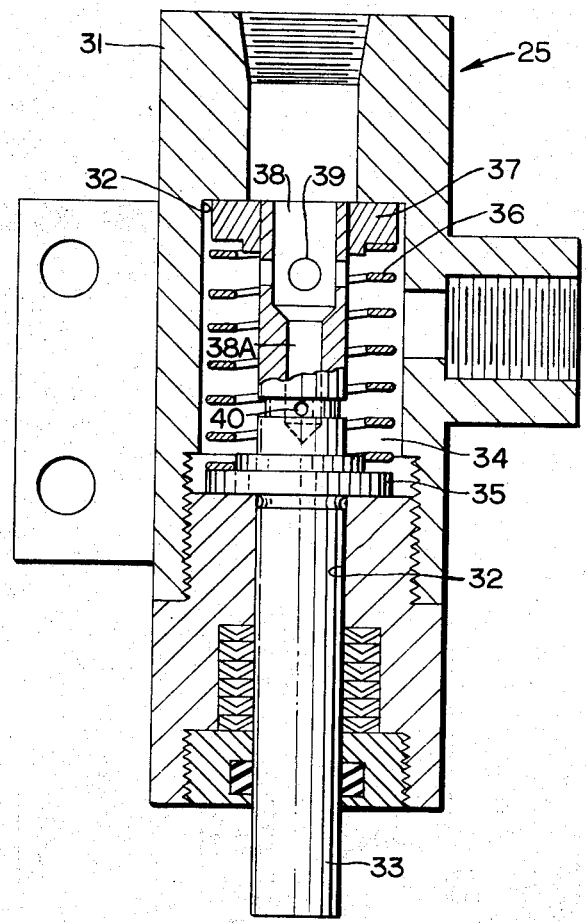
FIG. 6 is an enlarged longitudinal section of one of the restricter valves.

Each of the restricter valves 24 and 25 comprises a housing 31 (FIGS. 5 and 6) having a longitudinal bore 32 in which is positioned a plunger 33 which extends into a spring chamber 34 intermediate the ends of bore 32. The plunger is provided with spring seat 35 secured thereto. Spring 36 has one end engaging spring seat 35 and its opposite end engaging poppet 37 slidably mounted on plunger 33.

The cam 23 (FIGS. 3, 4 and 5) carried by turret 12 is adapted to be rotated with the turret throughout the full range of pivotal movement of the turret which is approximately 185°.

Figure 3:
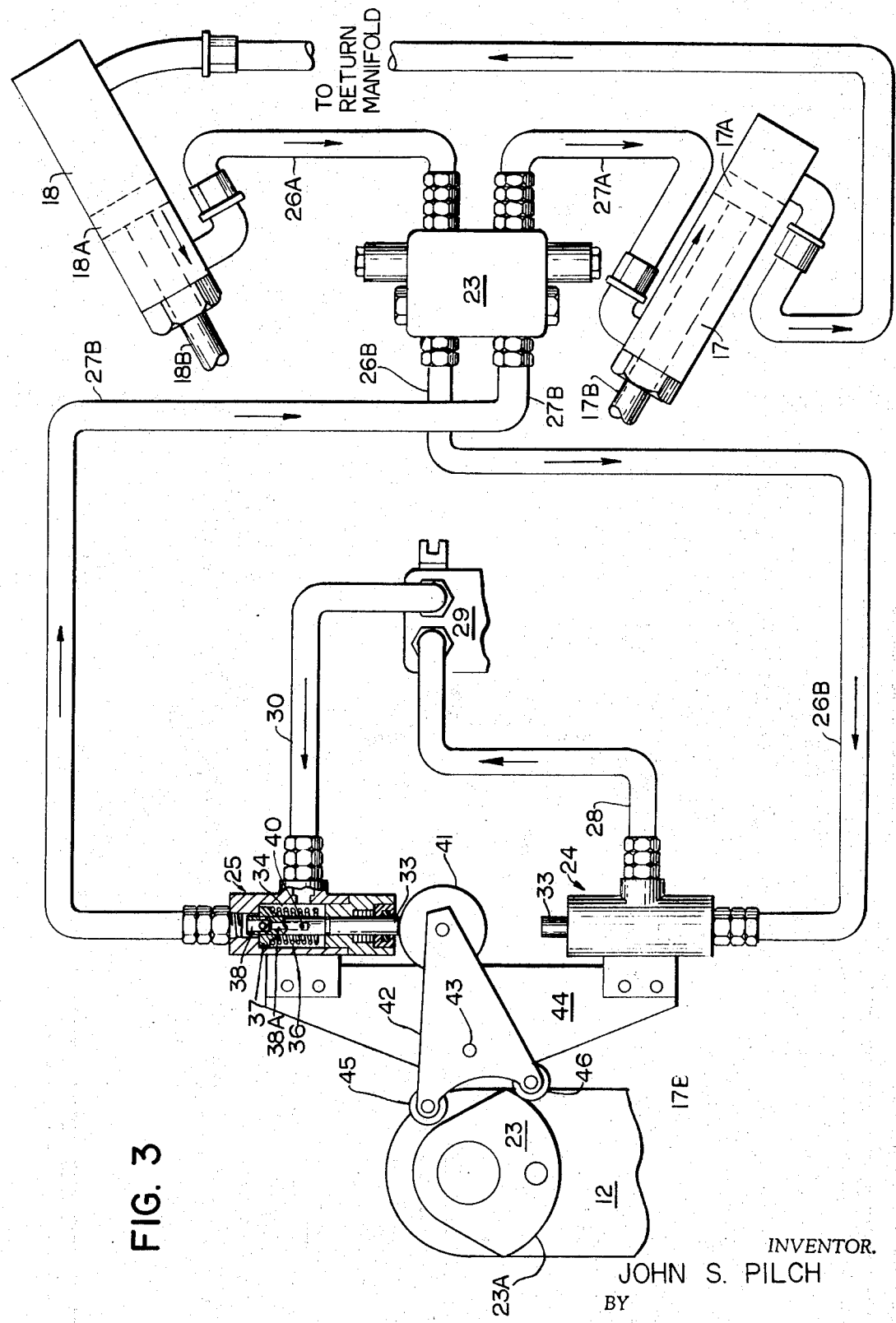
FIG. 3 is a schematic view showing a hydraulically actuated apparatus enbodying the invention with the restricter valve actuating mechanism in a position to restrict the flow of fluid to the rod side of the hydraulically actuated means which is causing the pivotal movement.
Figure 4:
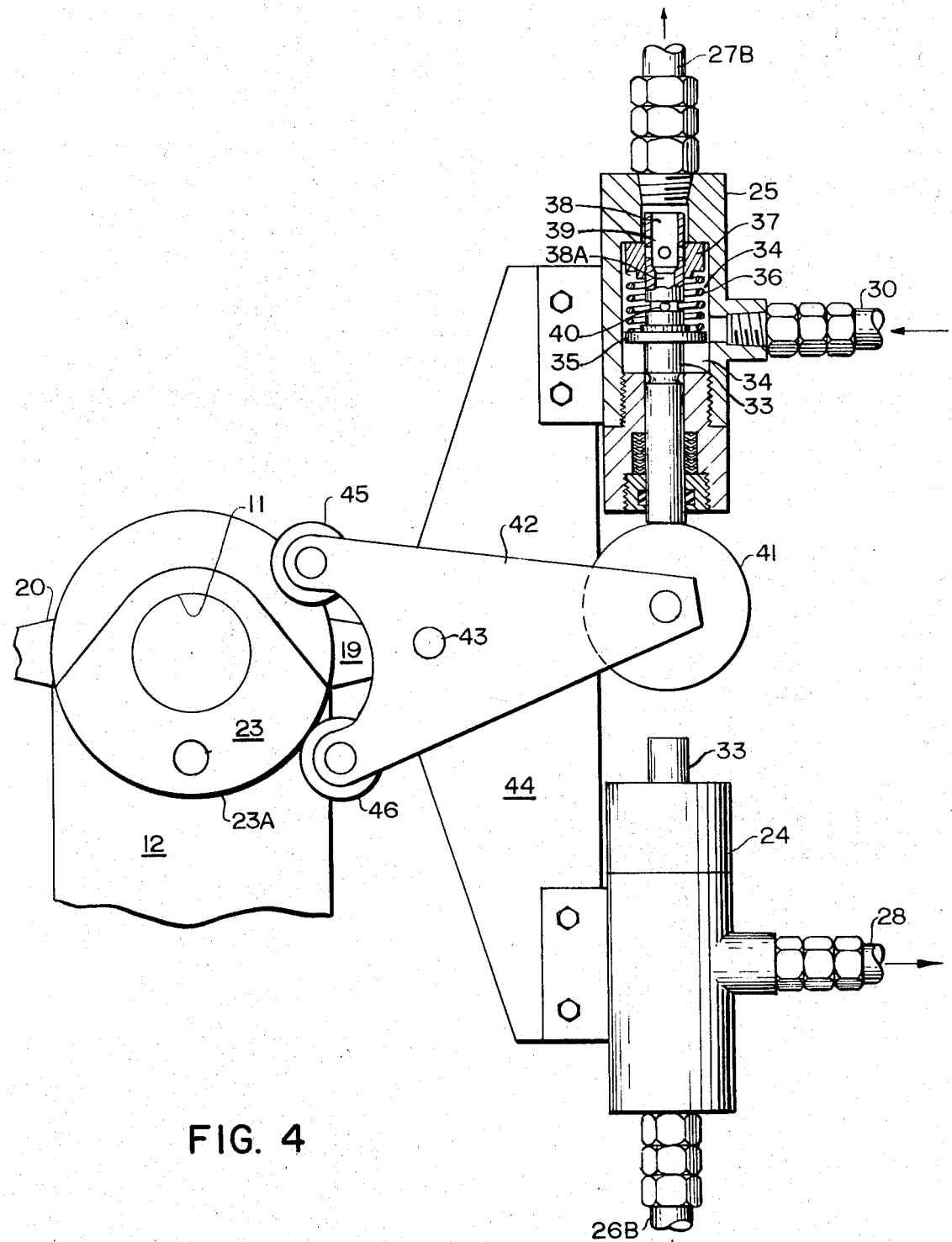
FIG. 4 is a fragmentary plan view on an enlarged scale of the restricter valve actuating mechanism and the restricter valves shown in FIG. 3 with one restricter valve shown in longitudinal section.

The system shown in FIGS. 3 to 5 is provided with opposed restricter valves 24 and 25 and between the adjacent ends of the plungers 33 there is positioned the roller 41 of cam follower 42 which is pivotally mounted at 43 on bracket 44. Cam follower 42 carries the rollers 45 and 46 which are adapted to be engaged respectively by cam surface 23A on cam 23 depending upon the direction of pivotal movement of turret 12. In FIG. 5, the turret 12 is shown at its center position at which time the cam surface 23A does not engage either of the followers 45 or 46.

When the turret 12 and cam 23 are pivotally moved in a counterclockwise direction from the position shown in FIG. 5 to the position shown in FIGS. 3 and 4, after a predetermined amount of such movement the cam surface 23A engages roller 46 and causes the follower 42 to move in a counterclockwise direction about its pivot 43 and to depress the plunger 33 which restricts the passage of fluid from the main control valve 29 through restricter valve 25 to line 27B, relief valve 23 and the rod end of cylinder 17.

This is accomplished as follows. Referring to the restricter valve 25, when the follower 42 is in the intermediate position of FIG. 5 the large ports 39 of this restricter valve afford substantially unobstructed flow of fluid from valve chamber 34 through them to passage 38 and then to conduit 27B. Thus, when the operator actuates the main control valve 29 to direct fluid through conduit 30, it passes substantially unobstructed through chamber 34, passage 38, conduit 27B, relief valve 23, conduit 27A to the rod end of cylinder 17 as shown by the arrows in FIG. 3. This causes ram 17A to move from left to right looking at FIG. 3 which causes rod 17B to pivotally move the turret 12 in a counterclockwise direction at a relatively high speed from its central position of FIG. 5 towards its six o'clock position of FIGS. 3 and 4. After a predetermined amount of such movement, the cam surface 23A engages roller 46 which causes cam follower 43 to be rotated in a counterclockwise direction about pivot 43 and roller 41 to force plunger 33 inwardly of the bore 32 of restricter valve 25, to the position shown in FIGS. 3 and 4 where the poppet 37 completely obstructs the flow of fluid from chamber 34 through ports 39 to passage 38. Thereafter, the fluid flows from chamber 34 through the small ports 40 to the smaller passage 38A, conduit 27B, relief valve 23, conduit 27A and rod end of cylinder 17. This slows down movement of the rod and the speed of pivotal movement of the turret and boom as they approach the six o'clock position of FIGS. 3 and 4.

During this entire cycle of pivotal movement, the large ports 39 in the other restricter valve 24 are open and they afford substantially unobstructed flow of fluid from rod end of cylinder 18, through relief valve 23, conduit 26B, valve chamber 34 to passage 38 to conduit 28 and main control valve 29, as shown by the arrows in FIG. 3. Thus there is substantially no restriction of the flow of fluid from the rod end of cylinder 18 to the main control valve.

When it is desired to cause pivotal movement of the turret in a clockwise direction from its position of FIGS. 3 and 4 or from its central position of FIG. 5, the operator actuates the main control valve 29 to cause fluid to flow through the conduit 28, valve 24, conduit 26B, relief valve 23 and rod end of cylinder 18 and this causes pivotal movement of the turret at a rapid speed, the direction of flow of fluid in the system being opposite to the direction indicated by the arrows in FIG. 3. When the turret and boom approach the twelve o'clock position, cam surface 23A engages roller 45 and causes follower 42 to rotate in a clockwise direction about pivot 43, and roller 41 slides plunger 33 inwardly of chamber 32 of valve 24 thus closing communication between large ports 39 and chamber 34 and the flow of fluid through the valve is thereafter restricted because it must pass through the smaller ports 40. This reduces the speed of pivotal movement of the turret and boom during the latter part of this clockwise movement.

By controlling the areas of the ports 40 and the restricted passages 38A, the reduction of speed of pivotal movement of the turret may be varied as desired.

In use of this invention for moving the turret and boom of a backhoe about a vertical axis for slightly more than 180°, it has been found that pressures on the fluid circuit do not exceed 2,500 pounds per square inch and that consequently failures do not develop in the system or in the mechanism as was the case in the apparatus of my prior U.S. Pat. No. 3,407,946. Furthermore, this is accomplished with only two cylinders 17 and 18 and the cost of manufacturing the apparatus is no greater than the cost of manufacturing the apparatus of my said prior patent.

While a cam and follower have been shown for actuating the restricter valves, it is pointed out that this actuation could be effected by direct contact with the turret, through a toggle means, through a linkage means, by a small hydraulic cylinder actuator, or through electrical means or other suitable arrangements.

While one desirable embodiment of the invention has been shown in the drawings, it is to be understood that this disclosure is for the purpose of illustration only and that various changes in shape, proportion and arrangement of parts as well as the substitution of equivalent elements for those herein shown and described, may be made without departing from the spirit and scope of the invention as set forth in the appended claims.

I claim:

1. In apparatus of the character described, in combination, a member mounted for pivotal movement, a source of fluid under pressure, hydraulically actuated means operatively connected to said member for causing pivotal movement thereof in a predetermined direction, a main control valve for directing fluid from said source of fluid through a conduit to the operative portion of said hydraulically actuated means, normally open valve means in said conduit and means operable responsive to the pivotal movement of said member for partially closing said normally open valve means when said member reaches a predetermined portion of pivotal movement, thereby automatically to restrict the flow of fluid through said conduit to said hydraulically actuated means during at least a portion of the subsequent pivotal movement of said member.

2. Apparatus as defined by claim 1 wherein said normally open valves means comprises a first, closable passageway for the flow of fluid and a second, permanently open passageway for the flow of said fluid, said closable passageway being closable by said means operable responsive to pivotal movement of said member.

3. Apparatus as defined by claim 2 wherein the second, permanently open passageway is smaller than said first, closable passageway.

4. Apparatus as defined by claim 3, wherein the means operable responsive to pivotal movement of said member comprises a cam on said member and a follower for said cam operative to move said normally open valve means to close said closable passageway.

5. Apparatus as defined by claim 4, wherein said normally open valve means comprises a housing having a longitudinal bore therein and a side aperture, said housing being connected to said source of fluid under pressure through said side aperture, a spring loaded plunger slidably disposed in said bore, the inserted end of said plunger having a longitudinal channel with axially displaced side ports, one of said side ports forming, with said channel and said side aperture, said permanently open passageway and other of said ports forming with said channel and said side aperture, said closable passageway.

6. Apparatus as defined by claim 1 also comprising a second hydraulically actuated means operatively connected to said member for causing pivotal movement thereof in a direction opposite to said predetermined direction, a second conduit affording communication between said main control valve and said second hydraulically actuated means, a second normally open valve means, said second valve means being in said second conduit, said means operable responsive to pivotal movement of said member being adapted to partially close said second normally open valve means when said member reaches a predetermined portion of pivotal movement thereby automatically to restrict the flow of fluid through said second conduit to said second hydraulically actuated means at least during a portion of the subsequent pivotal movement of said member.